United States Patent [19] [11] 3,885,473
Stratienko [45] May 27, 1975

[54] ADJUSTABLE SPEED GEAR DRIVE USING MULTIPLE CONE GEARING

[76] Inventor: Andrew Stratienko, 8503 Elliston Dr., Philadelphia, Pa. 19118

[22] Filed: Jan. 22, 1973

[21] Appl. No.: 325,546

[52] U.S. Cl. .................................. 74/349; 74/348
[51] Int. Cl. ............................................. F16h 3/22
[58] Field of Search ...... 74/349, 348, 681; 64/30 C, 64/30 D

[56] References Cited
UNITED STATES PATENTS

| | | | |
|---|---|---|---|
| 1,606,869 | 11/1926 | Christophel | 74/349 |
| 2,673,472 | 3/1954 | Dickas et al. | 74/348 |
| 2,857,750 | 10/1958 | Fox | 64/30 C |
| 2,936,641 | 5/1960 | Voelkl | 74/349 |
| 3,092,983 | 6/1963 | Huber | 64/30 C |
| 3,209,609 | 10/1965 | Kirschmann | 74/349 |
| 3,702,571 | 11/1972 | Sainz | 74/349 X |

FOREIGN PATENTS OR APPLICATIONS

| | | | |
|---|---|---|---|
| 12,251 | 7/1908 | Denmark | 74/349 |
| 42,617 | 6/1910 | Germany | 74/349 |

*Primary Examiner*—Samuel Scott
*Assistant Examiner*—Lance W. Chandler
*Attorney, Agent, or Firm*—Fulwider, Patton, Rieber, Lee & Utecht

[57] ABSTRACT

A gear drive comprising one or more gear stocks, each gear stock including a plurality of concentric gears arranged in a predetermined size progression order along a shaft and being engaged to a preselected level of torsional engagement to rotate with respect thereto. The respective stock gears transmit torque to the shaft by a frictional engagement mechanism comprising a plurality of washers interspaced between adjacent gears, with at least the end sliding washers making positive torsional engagement with the shaft, and an axial spring compressing the stock gears against the washers, and against each other through the washers, to a predetermined level of frictional engagement. An idler gear is carried in a yoke slidably and pivotally engaged at one end thereof to a shaft in parallel alignment with the stock gear shaft, where the other end of the yoke engages steps in a register slot, located to correspond to the engagement positions of the respective stock gears with the idler gear. The idler gear also simultaneously engages a driven gear, which in one of the embodiments can be any one gear of a second gear stock constructed substantially as set forth above, to provide a preselected gear ratio. At either end of the drive change gears are combined with said gear drive to provide a predetermined torque or speed advantage.

14 Claims, 6 Drawing Figures

| GEAR NUMERALS | TEETH COMBINATION | COL. A GEAR RATIO | COL. B INCREMENT MULTIPLIER | GEAR NUMERALS | TEETH COMBINATION | COL. C GEAR RATIO | COL. D INCREMENT MULTIPLIER |
|---|---|---|---|---|---|---|---|
| 31 | 58:58 | 1.0000 | 1.0175 | 131:181 | 58:57 | 1.0175 | 1.000297 |
| 32 | 58:57 | 1.01754 | 1.0178 | 132:182 | 59:58 | 1.0172 | 1.000287 |
| 33 | 58:56 | 1.03571 | 1.0181 | 133:183 | 60:59 | 1.0169 | 1.000277 |
| 34 | 58:55 | 1.05454 | 1.0185 | 134:184 | 61:60 | 1.0166 | 1.000268 |
| 35 | 58:54 | 1.07407 | 1.0188 | 135:185 | 62:61 | 1.0163 | 1.000260 |
| 36 | 58:53 | 1.09433 | 1.0192 | 136:186 | 63:62 | 1.0161 | 1.000252 |
| 37 | 58:52 | 1.11538 | 1.0196 | 137:187 | 64:63 | 1.0158 | 1.000244 |
| 38 | 58:51 | 1.13725 | 1.0200 | 138:188 | 65:64 | 1.0156 | 1.000236 |
| 39 | 58:50 | 1.16000 |  | 139:189 | 66:65 | 1.0153 |  |

3,885,473

ADJUSTABLE SPEED GEAR DRIVE USING MULTIPLE CONE GEARING

BACKGROUND OF THE INVENTION

The present invention relates to adjustable or variable ratio fixed speed gear drives, and more particularly to gear drives which are adapted to be varied in their ratio while running.

In the art of power transmission the occasions for varying the output speed of a gear train have had frequent occurrence and many various devices have been developed in the past to accomodate these features. Particularly since the development of synchronous motors with their inherent constant speed characteristics, essentially as accurate as conventional alternating power sources, the demand for precise adjustment of drive speed has been typically acute, and the industry has found many applications for such accuracy. Similarly, in applications like indexing mechanisms, tension control mechanisms, wire drawing apparatus and others, where a single rotary mover or drive unit drives a plurality of parallel shafts, the requirement of holding relative speed accuracy between driven shafts and holding such required fixed relationship between these speeds independently from rotational accuracy of the prime mover, has been universally recognized. In these applications it is very often necessary to perform such adjustments while running in order to match various feed speeds and the like. Thus many devices have been developed in the past to facilitate these requirements. In many cases, such prior art devices were either of the differential type, where the output speed is controlled by controlling the input speed of two input drives, or of a servo loop type where the automatic correction features of the servo control the speed of the drive. Other devices, such as hydraulic drives and the like, have also had some application in this area, however, with the typically low speed holding accuracy, which is common also, in lesser degree, to the differential and servo type drives. Most often, however, devices like variable pitch drives and traction drives have been used in the past to accomodate speed adjustment, both of which are inherently sensitive to variations in load. Accordingly, the demand for precision gear drives capable of accurately holding a preselected speed which also can be varied while running continues until present.

SUMMARY OF THE DISCLOSURE

Accordingly, it is the general purpose and object of the present invention to provide a variable ratio gear drive which will allow for precise ratio adjustment, or ratio adjustment in increments smaller than the tolerance deviations in speed of conventional drives, while running and maintain or hold such a fixed speed at preselected ratio inherent in conventional gear transmissions. Other objects of the invention are to provide: fo multiple gear engagement by one gear without interrupting gear mesh and changing center distance between driving and driven gears; repetitive use of same gear mesh for various total ratios; shifting of ratio while running under load without use of clutches; stepless speed variation while changing ratio; a wide range of speed variation starting from zero speed; and to perform all these objects in a simple manner while providing the high efficiency and accuracy inherent in gear drives. Yet another object of the invention is to provide such an adjustable gear drive which will also include torque overload protection and which includes simple and versatile construction for permanent change of gear ratio on the input and output ends for torque multiplication, or speed increase.

These and other objects are accomplished within the present invention by providing one or more gear stocks in any one gear drive, each such stock comprising a plurality of gears arranged on a common shaft in a progressively decreasing tooth number sequence, being free to rotate with respect to the shaft. An axial spring compresses said gears to a predetermined level of frictional engagement with respect to each other and the common shaft. An idler gear is mounted in a yoke pivoted about a splined shaft disposed in parallel relationship with the common gear stock shaft, said splined shaft having a driven gear mounted in splined engagement concentric therewith, where the idler gear is carried in the yoke, describing a limited pivotal arc and being in continuous engagement with the driven gear, being free to slide together with said driven gear along the splined shaft to engage the respective gears of the stock. The free end of the yoke forms a lever which is passed through a stepped register slot, the position of each step thereof corresponding to a predetermined engagement position of a particular gear in the stock with the idler gear. The idler gear is carried along with the yoke to engage the successive gears of the stock passing to the next gear at a moment in rotation of the stock when a tooth in the preceding stock gear is in alignment with a tooth of the next successive gear. Tooth breakage during passing, or while the idler gear engages concurrently two adjacent gears, is precluded by the relative rotational freedom between the stock gears, since the frictional engagement produced by the axial spring at this time is exceeded. Also, since engagement of the idler gear during passing is made simultaneously with two adjacent gears of unequal number of teeth, relative sliding between adjacent gears will take place and the effective ratio at this time will be a ratio intermediate the ratios of the adjacent gears, allowing for a smooth transition and gradual speed change between ratios of adjacent gears. It is contemplated that the tooth breakage load is selected to be greater than the frictional engagement between stock gears and shaft, allowing for gear shifting while running without gear breakage in conformance with the generally accepted design practices. Also included are spring means connected to the lever on the free end of said yoke for positive location thereof at any selected lever location in the register. In the other embodiments of this invention two parallel gear stocks are utilized, being selectively meshed by an idler which is also carried in a yoke to produce gear ratios corresponding to the ratios of the respective gears in opposed alignment on the parallel stock shafts, whereby very small increments in ratio can be achieved allowing for a very precise adjustment. Since the gears in the respective stocks are also coupled to their shafts by frictional engagement, the same stepless ratio progression between adjacent stock gears can be made as described above. It is further contemplated that the above embodiments be utilized in combination with permanent change gears fixed to their respective shafts, and in combination with gear drives of the differential type, to form combinations having wide range of speed variation starting from zero speed.

DESCRIPTION OF THE PREFERRED EMBODIMENT

Figure 1:
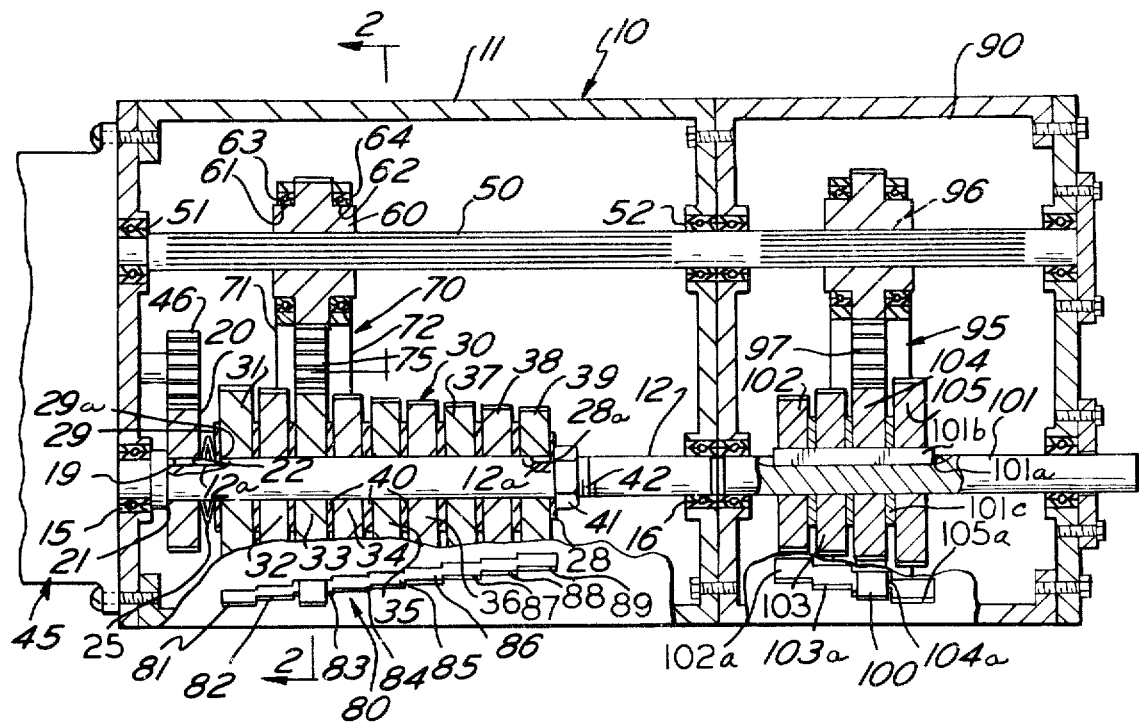
FIG. 1 is a side view in partial cross section of one embodiment of the present invention.

As shown in FIG. 1, a variable ratio gear assembly 10 comprises a housing 11 generally shaped in the form of a closed container. Disposed within said housing 11, in substantially parallel alignment with the longitudinal axis thereof, is a stock gear shaft 12 mounted for rotation in bearings 15 and 16 at the distal ends thereof. Bearings 15 and 16 are retained according to conventional means in the art in the opposite ends of housing 11 allowing for free rotation of the shaft 12 therebetween. Shaft 12, proximate one end thereof and on the interior housing 11, forms a keyway 19. Immediately distal of keyway 19, the shaft 12 is formed into a shoulder 21. A drive gear 20 engages shaft 12 by a key 22 being urged against shoulder 21 by an axial or conical spring 25 mounted concentrically with shaft 12. At the other end, spring 25 abuts through tang washer 29 against one side of a gear stock 30 which comprises a plurality of gears 31-39 of various sizes arranged by their sizes in a progressive or descending order and concentrically mounted on shaft 12. Such progressive order of gear arrangement is necessary to produce a small and gradual increment in difference in the number of teeth between adjacent gears 31-39. Also mounted on shaft 12, intermediate gears 31-39 are concentric washers 40, finished to provide a predetermined coefficient of friction, according to well known means in art, upon compression of the gear stock. Furthermore, gear stock 30 is placed between two sliding tang washers 28 and 29 which transmit torque to shaft 12 by tangs 28a and 29a engaging a groove 12a in shaft 12. At the distal side, gear stock 30 abuts through tang washer 28 against a nut assembly 41 threaded onto threads 42 formed on shaft 12. In this manner, nut assembly 41 provides an adjustable compressive force through tang washer 28 to stock 30 and across the other tang washer 29 to the axial spring 25, allowing for a predetermined torsional engagement between gears 31-39 and shaft 12, which is positively engaged with drive gear 20.

A motor 45 is mounted on the outside of housing 11 driving a pinion gear 46 in a conventional manner which extends into the housing to engage drive gear 20. Motor 45 can be any conventional unit available commercially which produces the desired pinion rotational rate and torque.

Also disposed in housing 11 in parallel alignment with shaft 12 is a splined yoke shaft 50. Yoke shaft 50 rotates in bearings 51 and 52 at the distal ends thereof, passing through bearing 52 to the outside of housing 11. Shaft 50 is splined for engagement according to conventional practice having slidably mounted thereon a sliding gear 60, the hub thereof forming on both sides annular lips or shoulders 61 and 62, concentric with shaft 50, said shoulders having respectively mounted thereon pivot bearings 63 and 64. A yoke assembly 70 is mounted for pivotal rotation on bearings 63 and 64 comprising two yoke side plates 71 and 72, each engaging at one end respectively, bearings 63 and 64 having mounted for rotation therebetween an idler gear 75 disposed to maintain constant mesh with sliding gear 60. Idler gear 75 also engages any one of the stock gears of gear stock 30, being free to slide and to pivot together with yoke assembly 70 along and about the shaft 50 to engage any other gear thereof. Yoke assembly 70 carrying idler gear 75 describes a limited pivotal arc about shaft 50 and sliding gear 60. Therefore the idler gear is always a fixed radial distance away from the shaft making continuous engagement with the sliding gear 60. At the free end, yoke assembly 70 terminates in a lever 85 which extends through a stepped opening or register slot 80 to the outside of housing 11, including spring loaded means mounted thereon for positive engagement at any step thereof further described herein. Register slot 80 forms a plurality of steps 81-89 formed and sized in housing 11 to correspond with the location of the yoke lever 85 when the idler gear is in proper mesh with respective stock gears 31-39, allowing for manual shifting of lever for selection of any desired gear mesh in the stock.

Register slot 80 restricts pivotal movement of the yoke and determines the selection sequence which yoke 70 with idler 75 will follow to engage the respective stock gears. In this manner, the idler gear must engage and pass the adjacent gears in progressing to a more distant gear ratio without interrupting gear mesh, such that continual alignment of the respective stock gears takes places, as described above, providing gradual and stepless speed variation. Gears 31-39 are fixed to shaft 12 and relative each other by friction means only such that simultaneous engagement of two adjacent gears of different sizes by the idler will force relative sliding and alignment of the gear mesh in both gears, producing a gear ratio intermediate the ratios of the adjacent gears. The freedom of entering of the idler in new gear mesh and progression of the idler into the next adjacent stock gear is assured by the uneven number of teeth in the adjacent gear, which in any one revolution will have at least one tooth in alignment with a tooth in the preceding gear. It is further contemplated that the relative diameters of the adjacent stock gears are such that the idler, while shifting, enters in new mesh without being disengaged from the previous, allowing gear shifting while operating under load.

Figure 2:
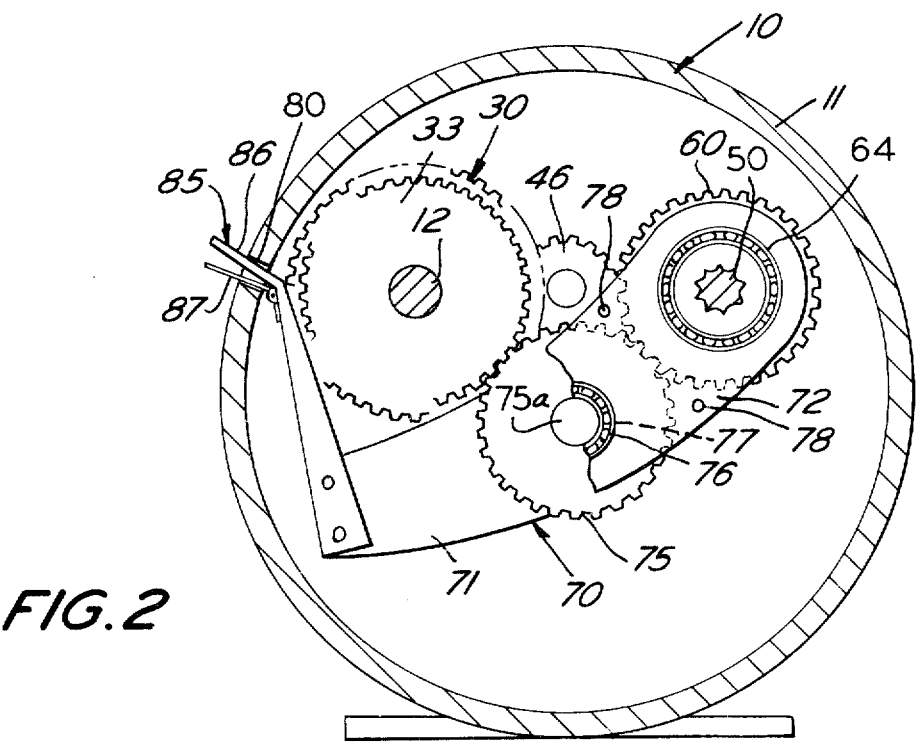
FIG. 2 is a cross section view rotated by 90°, taken along line 2—2 of FIG. 1, illustrating some of the details of a yoke of FIG. 1.

As shown in more detail in FIG. 2, yoke assembly 70 further includes bearings 76 and 77 having mounted therebetween idler gear 75. Bearings 76 and 77 provide rotational support for shaft 75a positively secured in the bore of the idler gear 75 and are respectively mounted in members 71 and 72 according to any conventional means practiced in the art, members 71 and 72 being joined by bolt assemblies 78 to form one unit pivoted around shaft 50. At the free end, the yoke assembly 70 forms a spring loaded lever assembly 85 comprising a lever 86 affixed between the ends of members 71 and 72 and shaped to extend through register 80. A leaf spring 87 is attached to the lever at one end thereof extending through opening 80 to urge the lever against the edges of the register slot for positive locking of the lever to assure proper and stable gear mesh.

On the distal end of housing 11, a second cavity or housing 90 is formed having said yoke shaft 50 passing therethrough. A second yoke assembly 95, constructed substantially similar to yoke assembly 70, includes a sliding gear 96 and an idler gear 97, terminating at the free end in a register slot 100 formed in housing 90 in a manner substantially similar to lever assembly 85, described above. Also disposed in housing 90, in substantial alignment with shaft 12, is a second gear stock shaft 101 including a keyway 101a for engaging through a key 101b a plurality of concentric gears 102–105 of various sizes. Gears 102–105 are separated by washers 101c from each other to provide the necessary clearances for engagement of the idler 97 with said gears. The register slot 100 forms a plurality of steps 102a–105a where the position and size of each step corresponds to the engagement position of yoke 95 and idler 97 with corresponding gears 102–105. Shaft 101 protrudes to the outside of housing 90 to provide extension for coupling any driving mechanism (not shown). It is to be noted that due to the positive engagement of gears 102–105, gears 102–105 together with yoke 95 comprise a gear box which is shifted while stationary to select the approximate gear ratio. The final gear ratio is selected during operation by movement of lever assembly 85 in register slot 80. It is therefore contemplated that gears 31–39 include a gear ratio range covering the ratio increment between any two adjacent gears 102–105 in order to provide full adjustment once an approximate speed is selected.

Figure 3:
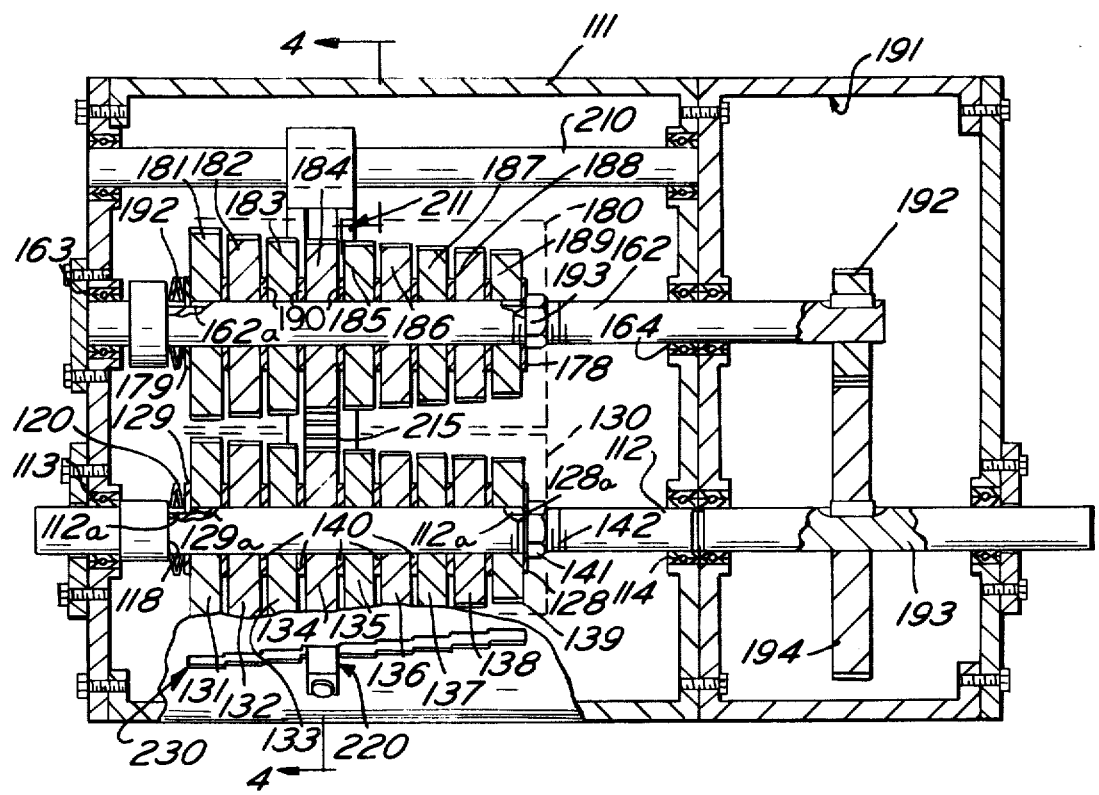
FIG. 3 is a side view in partial cross section of yet another embodiment of the present invention particularly adapted to provide very small or precise adjustments in gear ratio.

Another embodiment of the present invention is shown in FIG. 3, teaching an apparatus for providing a more precise adjustment in gearing. As illustrated therein, a housing 111 includes a first gear stock shaft 112 mounted for rotation in bearings 113 and 114 in the opposite walls thereof and protruding to the outside housing 111 to engage conventional drive units. A shoulder 118 is formed on the shaft 112, proximate the one end thereof and on the inside of housing 111, having an axial spring 120 abutting thereto. Spring 120 is urged into compression by a gear stock 130 comprising a plurality of concentric stock gears 131–139 mounted for rotation on shaft 112, each stock gear differing from the adjacent gear by at least one tooth, arranged in a descending or ascending order, including friction washers 140 disposed between adjacent gears. At both ends gear stock 130 abuts tang washers 128 and 129, each respectively engaging shaft 112 by tangs 128a and 129a protruding into a groove 112a formed therein. Thus all gears of stock 130 are frictionally secured to shaft 112 through tang washers 128 and 129, being compressed by a nut assembly 141 engaging threads 142 formed on shaft 112 against spring 120 to a predetermined level of torsional securing. A second stock shaft 162 is disposed in housing 111 in parallel alignment with shaft 112, being mounted for rotation in bearings 163 and 164 affixed in the opposite ends of housing 111. Shaft 162 passes to the outside of housing 111 into a cavity 191 formed at the other end thereof.

A second gear stock 180, comprising stock gears 181–189 is frictionally secured on shaft 162 including friction washers 190 interposed between adjacent gears having tang washers 178 and 179 abutting the distal ends thereof. Shaft 162 is shaped to form a shoulder proximate the one end thereof having abutting thereto an axial spring 192 similar to shaft 112, and includes a groove 162a for engagement of the tang washers. Gear stock 180 is compressed against spring 192 by a nut assembly 193, in substantial opposing parallel alignment with gear stock 130. A pivot shaft 210 is also disposed and secured in housing 111, in parallel alignment with shafts 112 and 162, having movably mounted thereon a yoke assembly 211. Yoke assembly 211 is free to slide along shaft 210 and to pivot thereabout, carrying an idler gear 215 for simultaneous engagement of corresponding gears in stocks 130 and 180. At the free end, the yoke assembly forms a lever or detent assembly 220 extending through a stepped register slot 230 to the outside of housing 111.

Figure 4:
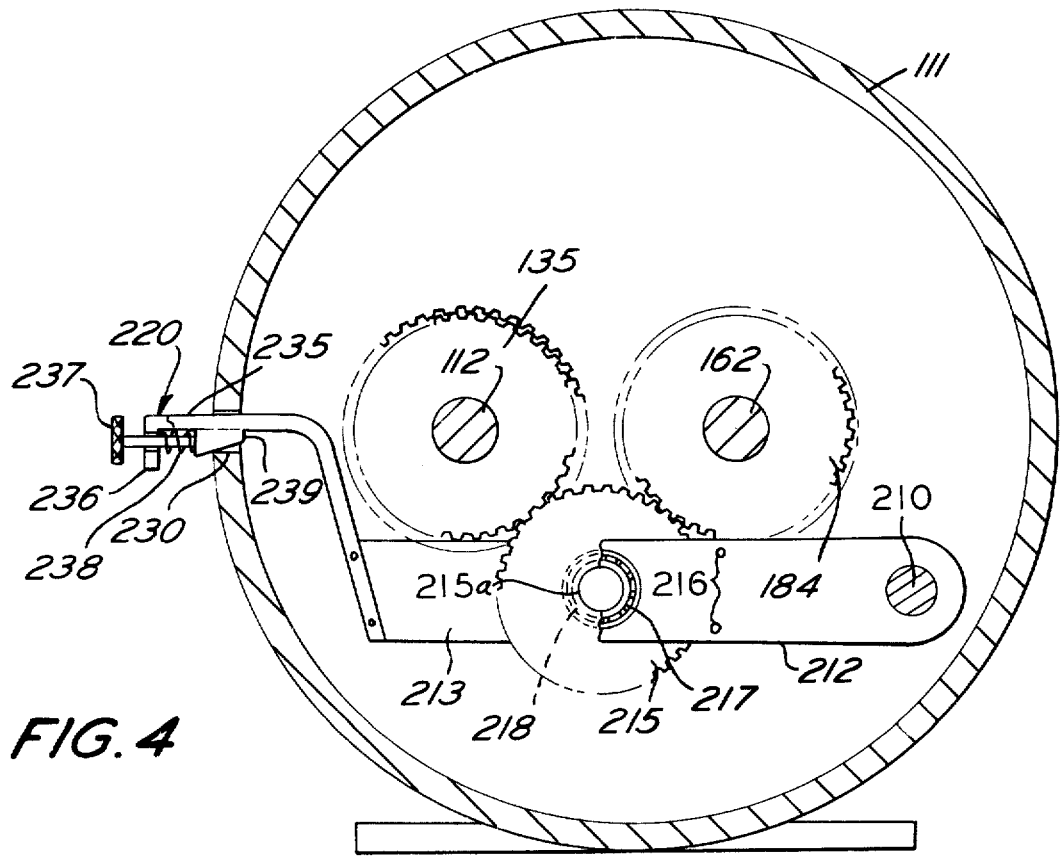
FIG. 4 is a view in cross section, rotated by 90° taken along lines 4—4 of FIG. 3.

As shown in more detail in FIG. 4, yoke assembly 211 comprises two parallel members 212 and 213, both members pivotally engaging shaft 210 at one end thereof, being joined together by bolt assemblies 216 to form a single structure. Each member includes bearings 217 and 218 aligned in concentric relationship, supporting therebetween idler gear 215. The pivot point for yoke 211 is positioned in housing 111 to assure that idler gear in its pivotal movement will remain substantially equidistant from the two stock shafts, such that a substantially simultaneous engagement is made between the idler gear and corresponding gears of gear stocks 130 and 180. Yoke assembly 211 terminates in a lever 235 on the outside of register slot 230, terminating in an overhanging tip 236 pierced to receive a plunger assembly 237, spring loaded by a spring 238 to press a wedge 239 into the register slot 230 adjacent lever 235. It is to be noted that in this embodiment the adjacent gears in stocks 130 and 180 differ in size by at least one tooth. Also, driving and driven gears of opposed gear stocks, which are in simultaneous mesh with the idler, may also differ in size by one tooth or more. Furthermore, the gears in each stock are restrained from relative rotation and secured on the shaft by frictional means permitting simultaneous engagement of any two adjacent gears and thereby allowing for adjustments in gear ratio while running under load.

In this embodiment, the variation or adjustment in gear ratio is accomplished by a change of engagement of the same intermediate idler 215 simultaneously with respective opposing gears from stocks 130 and 180. While shifting, the said pairs of opposing gears being engaged with idler 215, will simultaneously and gradually increase or decrease in size, producing in this way, ratio increment much smaller than in the case of the first embodiment where only one gear varied in size and other such as a sliding gear 60 was fixed in size. Thus, the increments in ratio available in this embodiment can be smaller for gears of substantially equal size, than those of the first embodiment.

Shaft 162, at the other end thereof, extends into cavity 191, terminating therein in a conventional pinion 192. A second shaft 193 is also mounted for rotation in cavity 191, having mounted thereon a fixed gear 194 in constant engagement with pinion 192 such that any desired permanent change in ratio can be formed therebetween.

It is to be noted that the embodiments shown in FIGS. 1 and 3 illustrate gear drives which are fully reversible and any reference to a particular input-output direction is for purposes of clarity only, not being intended as a limitation.

Figures 5, 6:
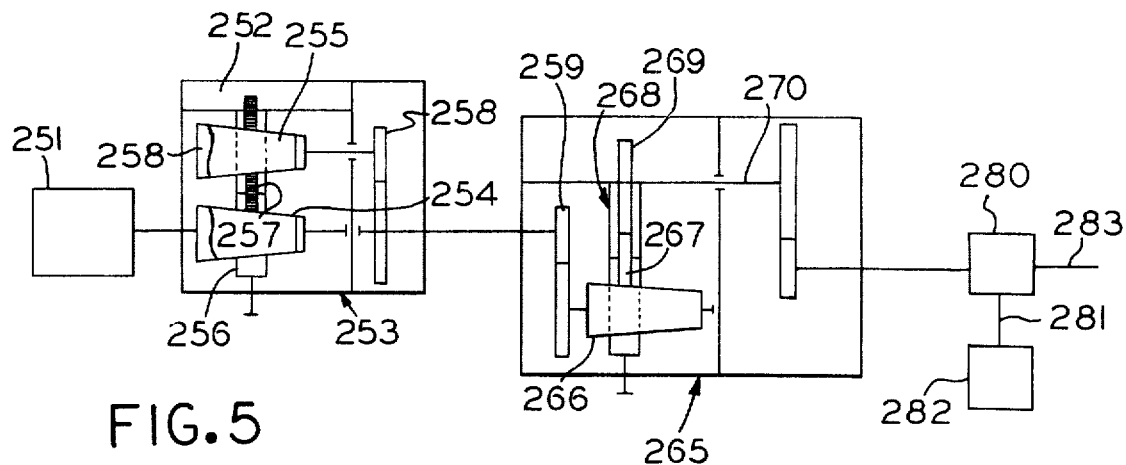
FIG. 5 is a schematic illustration of one embodiment combining the embodiments of FIGS. 1 and 3 in combination with a differential gear box and motor.
FIG. 6 is a table of typical gear ratios illustrating one example of the respective ratio multipliers of the embodiments of FIGS. 1 and 3.

Further embodiments of the present invention are possible as shown in FIG. 5. In particular, FIG. 5 illustrates a combination wherein the embodiment of FIG. 1 is combined with that of FIG. 3, providing two levels of precision in adjustment. Addition of a differential gear box allows for a further extension of gearing with full adjustment about any one setting of the gear box. Furthermore, by proper selection of the two input rates to the differential gear box, overall speeds around zero r.p.m. can be obtained. Specifically shown in FIG. 5 is an electric motor 251, such as for example a synchronous motor, attached to a housing 252 of a precise adjustment assembly 253. Assembly 253 comprises two gear stocks 254 and 255 constructed substantially according to the embodiment illustrated in FIG. 3. A yoke assembly 256 includes an idler gear 257 in simultaneous engagement with corresponding gears of stocks 254 and 255. Stock 254 and stock 255 both engage their respective shafts by friction means such as the axial spring and nut assembly combination described above, where the shaft of stock 254 cooperates with the motor 251 driving stock 255 through idler gear 257 at a ratio corresponding to the gear ratio of the respective gears meshed. Stock 255 in turn drives a pinion 258 extending to the outside of housing 252. Pinion 258 through pinion 259 drives a fine adjust gear assembly 265 constructed substantially similar to the assembly 10 of FIG. 1, comprising a gear stock 266 and an idler gear 267 mounted in a yoke assembly 268 in constant engagement with a sliding gear 269 in splined engagement with a drive shaft 270 which extends into a conventional differential gear box 280. As it is now in the art, gear box 280 also receives a second input 281 from another motor 282, the speed of the output shaft 283 determined by the relative ratios of the two inputs and final permanent gear ratio between the differential and the support shaft itself. In this manner, desired range of output speeds is available by selecting predetermined input speeds.

It is to be noted that the nomenclature fine and precise is utilized in this instance only to distinguish between the embodiments of FIG. 1 and FIG. 3 and any degree of precision is more properly a function of the relative gear sizes used in each embodiment; the two stock embodiment of FIG. 3, however, will yield smaller or more precise increments in gear ratios for gears substantially of the same size as those of a one stock embodiment of FIG. 1.

The operation of the present invention will now be set forth with reference to FIGS. 1, 3 and 5 and with particular reference to FIG. 6 to illustrate the distinction between the embodiments of FIGS. 1 and 3. FIG. 6 shows one specific example of gearing ratios available from stock gears of substantially equal size. Column A of FIG. 6 sets out one example of gearing ratios between gears 31-39 of stock 30 as against the sliding gear 60, which is substantially of a size equal to the gear 31 of stock 30, and the corresponding increment multipliers are set out in Column B. This illustration shows avarage increment multipliers of approximately 1.85 percent, however, larger or smaller increments are possible by providing smaller or larger gears in the gear stock. For substantially the same range of gear sizes, however, the embodiment illustrated in FIG. 3, provides average increment multipliers of about 0.025%, as shown in column D. In this case, the ratio of the next successive gear pair is determined by the ratio of the two gears, both of which are successively increasing in size or tooth number. In applications where the gear sizes are determined by design considerations other than those of gearing ratio or size of increment, it is possible to select the general value of the increment by using larger than one tooth difference between corresponding driving and driven gears on opposed gear stocks. Furthermore, by connecting in series the two embodiments of FIG. 1 and FIG. 3, a broad range of adjustment is possible, where the embodiment of FIG. 3 provides adjustment across the increments of the embodiment of FIG. 1.

Passing between adjacent gears by the idler is assured by the fact that the gear stock is rotating during adjustment and there being an uneven number of teeth in the adjacent stock gears at least one tooth thereof will be in alignment in any one revolution permitting the idler gear to pass. Also, normal axial alignment tolerances or intentional misalignment between the respective stocks of FIG. 3 assure that the idler gear will pass to engage the next successive gear in one stock before engaging the next gear in the other stock. While the idler gear commonly engages two adjacent stock gears in any one stock tooth alignment is maintained by the relative sliding between gears facilitated by the frictional means of torsional engagement and the idler gear can be moved further into complete engagement. The stepped register slot allows motion of the yoke along the gear stocks until a particular engagement is made assuring complete engagement at that location.

Generally, to enable the shifting of the idler from one gear mesh to another while operating under load, the idler remains in uninterrupted gear mesh during shifting in embodiment of FIGS. 1 and 3. For this reason, the gear stock is frictionally secured on the shaft by means of axial or conical springs which compress axially all gears between and against the washers, the end washers being positively keyed on the shaft to transmit torque. Since the size of the adjacent gears of the gear stock differ by one tooth, the idler, when shifting, is moved radially at least one-fourth of working depth of a tooth and enters in a new gear mesh without being disengaged from the previous one. Such a momentary simultaneous engagement of the idler with two adjacent gears of different sizes will cause slight relative circumferential sliding of one gear with respect to the other, producing in this way, gradual change of output speed between two fixed ratios. Furthermore, frictional securing of a gear provides not only stepless change, but also protects gears from shocks, overload and assures smooth start up condition. Radial movement of the idler and positive radial and axial locking thereof in properly engaged operating position is provided by the register slots together with the spring and lever.

Some of the many advantages of the present invention should now be readily apparent. The invention provides means for positive adjustment of the gear ratio in any desired increment in a structure that utilizes the simplicity, reliability and accuracy of conventional gear drives. Furthermore, the invention utilizes the tolerances of manufacture to an advantage avoiding the need for precision fabrication and alignment typical in such structures. Also, adjustment in gear ratio is predictable to an accuracy typical of selective gear boxes and can be performed without interruption in operation. The invention also allows for repetitive use of same gear ratio to provide adjustment between adjacent gears of another gear drive connected in series.

Obviously many variations and modifications are possible in the light of the above teachings. It is therefore intended that the scope of the present invention be determined by the appended claims.

I claim:

1. An adjustable speed gear drive comprising in combination:
   a common structure;
   gear stock means mounted for rotation in said structure, including a plurality of stock gears of various predetermined sizes mounted for rotation on a stock shaft, for providing a plurality of engageable stock gears arranged in a progressively descending order;
   torsional engagement means mounted on said gear stock means for securing said stock gears to said stock shaft to a predetermined level of torsional engagement; and
   yoke means mounted in said structure for selective translation between respective ones of said stock gears in concurrent engagement with adjacent ones thereof while running and providing a gear ratio corresponding to the gear size thereof.

2. An adjustable speed gear drive according to claim 1, wherein:
   adjacent ones of said stock gears are varied in radial dimension by increments less than the respective tooth height thereof.

3. An adjustable speed gear drive according to claim 2 wherein said torsional engagement means further comprising:
   friction means operatively connected between said stock gears and said stock shaft for transmitting torque therethrough.

4. An adjustable gear drive according to claim 3 wherein said friction means further comprising:
   one or more members slidably mounted on said stock shaft and torsionally secured thereto for transmitting torsional forces to said stock shaft; and
   axial spring means mounted on said stock shaft for compressing said stock gears against said members to a predetermined level of frictional engagement.

5. An adjustable speed gear drive according to claim 4, wherein said yoke means further comprising:
   a yoke shaft disposed in said structure in parallel arrangement with said stock shaft;
   a yoke operatively connected at one end thereof for pivotal and slidable motion to said yoke shaft;
   an idler gear mounted for rotation in said yoke disposed to engage selected ones of said stock gears;
   register means disposed in said structure for receiving the other end of said yoke; and
   gear drive means disposed in said structure in engagement with said idler gear for transmitting torque therethrough.

6. An adjustable speed gear drive according to claim 5, wherein:
   said gear drive means including a drive gear slidably mounted on said yoke shaft and means attached to said drive gear for torsionally securing said drive gear to said yoke shaft; and
   said register means including a slot forming a plurality of steps, each step corresponding to the location of the other end of said yoke upon engagement of said idler gear with respective ones of said stock gears and spring means affixed to the other end of said yoke for urging thereof against the sides of said slot.

7. An adjustable speed gear drive comprising in combination:
   a common structure;
   first gear stock means mounted for rotation in said structure, including a plurality of first stock gears of various predetermined sizes mounted for rotation on a first stock shaft, for providing a plurality of engageable stock gears arranged in a progressively descending order;
   first torsional engagement means mounted on said first gear stock means for securing said first stock gears to said first stock shaft to a predetermined level of torsional engagement;
   second gear stock means mounted for rotation in said structure in substantially opposing and parallel alignment with said first gear stock means, including a plurality of second stock gears of various predetermined sizes mounted for rotation on a second stock shaft for providing a plurality of engageable stock gears arranged in a progressively descending order;
   second torsional engagement means mounted on said second gear stock means for securing said second stock gears to said second stock shaft to a predetermined level of torsional engagement; and
   gear yoke means mounted in said structure for selective translation in concurrent engagement with adjacent ones of said first and second stock gears while running for engaging respective opposing ones of said first and second stock gears and providing a gear ratio corresponding to the relative sizes of said opposing ones thereof.

8. An adjustable speed gear drive according to claim 7, wherein:
   adjacent ones of said first and second stock gears are varied in radial dimension by increments less than the respective tooth height thereof.

9. An adjustable speed gear drive according to claim 8 wherein said first and second torsional engagement means further comprising:
   friction means operatively connected between said first stock gears and said first stock shaft and between said second stock gears and said second stock shaft for transmitting torque therethrough.

10. An adjustable speed gear drive according to claim 9 wherein said friction means further comprising:
    one or more members slidably mounted on said first and second stock shafts and torsionally secured thereto for respectively transmitting torsional forces to said first and second stock shafts; and
    axial spring means mounted on said first and second stock shafts for compressing said first and second gears respectively against said members to a predetermined level of frictional engagement.

11. An adjustable speed gear drive according to claim 10, wherein said gear yoke means further including:
    a gear yoke shaft disposed in said structure in parallel arrangement with said first and second stock shaft;

a gear yoke pivotally and slidably mounted at one end thereof on said gear yoke shaft;

an idler gear mounted for rotation in said gear yoke for selective concurrent engagement of respective opposing ones of said first and second stock gears; and register means formed in said structure for supporting the other end of said gear yoke.

12. An adjustable speed gear drive according to claim 11 further comprising:

said register means including a slot forming a plurality of steps, each step corresponding to the location of the other end of said gear yoke upon concurrent engagement of said idler gear with respective opposing ones of said first and second stock gears, and spring means affixed to the other end of said yoke for urging thereof against the sides of said slot.

13. An adjustable speed gear drive according to claim 12 wherein:

said respectively opposing ones of said first and second stock gears being axially offset relative each other, the offset dimension being less than the width of said idler gear.

14. An adjustable speed gear drive comprising:

a structure;

stock means mounted for rotation in said structure, including a plurality of concentric stock gears of various sizes for providing a plurality of engageable gears arranged in a predetermined order;

a yoke shaft disposed in said structure in parallel arrangement with the axis of rotation of said stock gears;

a yoke pivotally and slidably mounted at one end thereof on said yoke shaft;

an idler gear mounted for rotation in said yoke for selective engagement of said stock gears;

register means formed in said structure for receiving the other end of said yoke;

drive means disposed in said structure for engagement with said idler gear;

adjustable gear drive means operatively connected to said yoke shaft, including a shaft, a plurality of concentric gears of predetermined sizes mounted in descending order for rotation on said shaft, friction means interposed between said shaft and said gears for securing said gears to said shaft to a predetermined level of frictional engagement;

idler means carrying an idler gear pivotally and slidably mounted in said structure for selective translation between respective ones of said concentric gears in concurrent engagement with adjacent ones thereof for engaging respective ones of said gears; and gear means disposed in said structure for continuous engagement with said idler gear whereby said adjustable gear drive means having said adjustable gears of said predetermined sizes are selected to produce a group of total ratios of said adjustable speed gear drive and said adjustable gear drive with magnitude intermediate of any two ratios produced by any adjacent said stock gears of said adjustable speed gear drive.

* * * * *